April 10, 1951    H. KNOWLER ET AL    2,548,481
FLYING CONTROL FOR AIRCRAFT
Filed Nov. 29, 1947    3 Sheets-Sheet 1
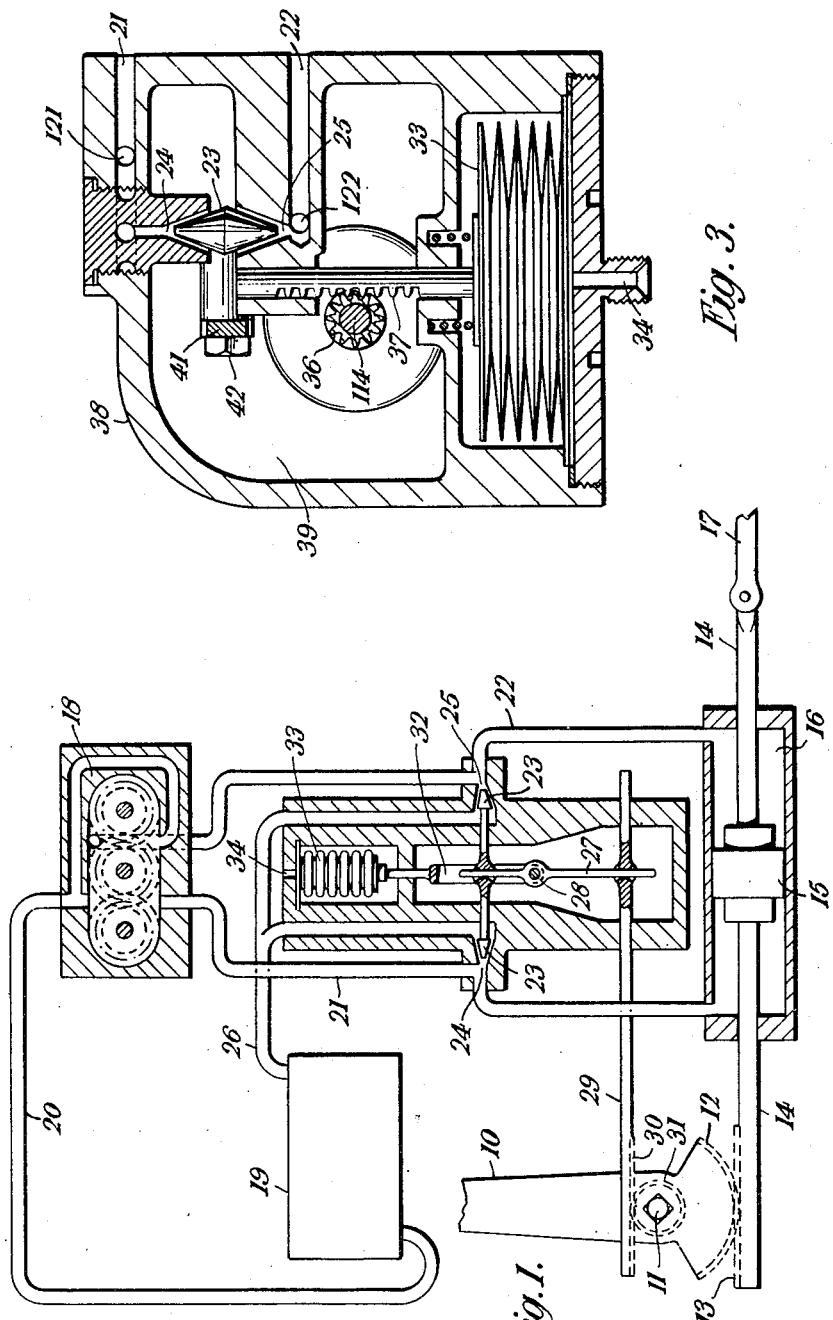

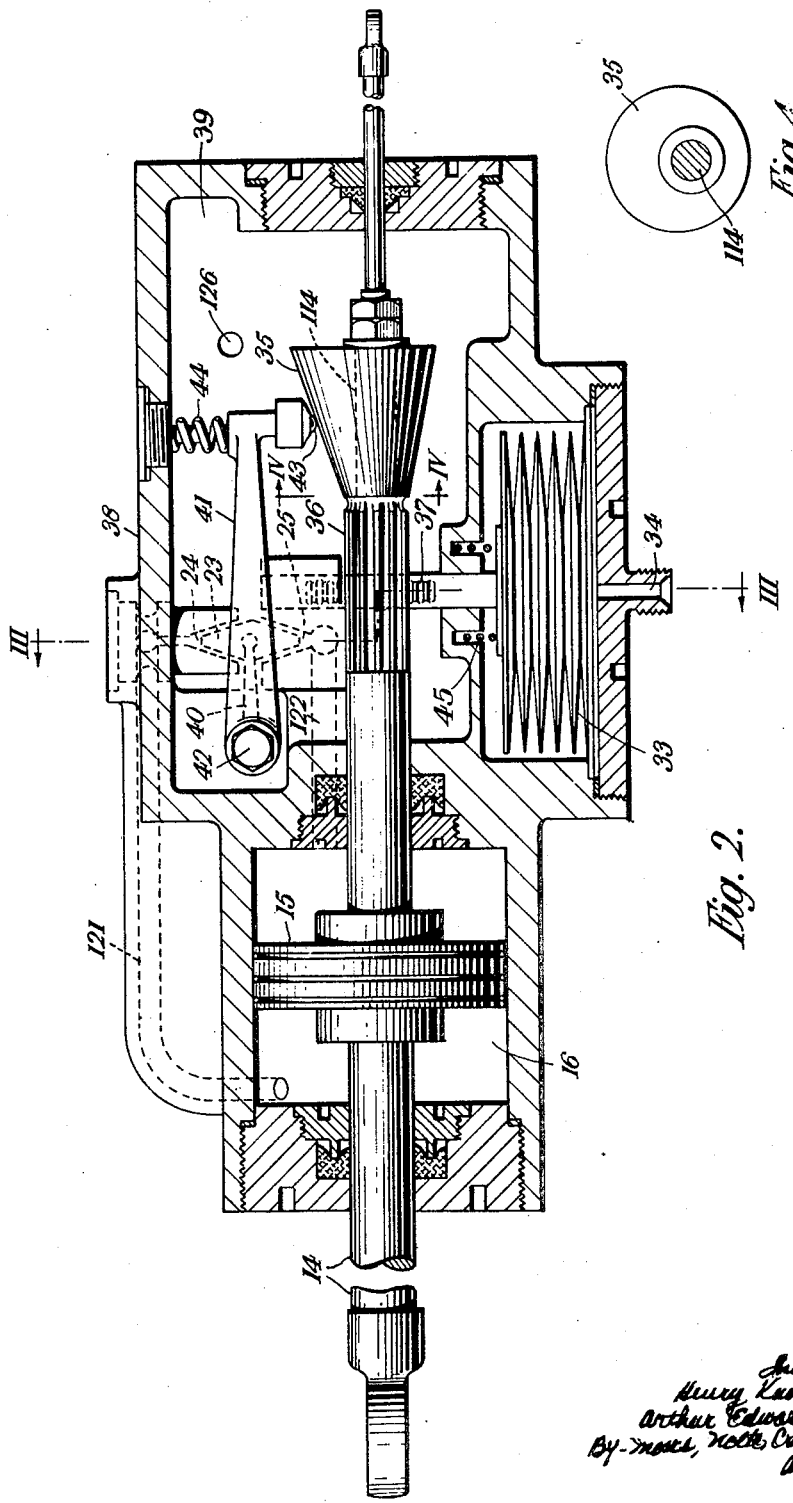

Patented Apr. 10, 1951

2,548,481

UNITED STATES PATENT OFFICE 2,548,481

FLYING CONTROL FOR AIRCRAFT

Henry Knowler, Ryde, and Arthur Edward Swain, East Cowes, Isle-of-Wight, England, assignors to Saunders-Roe Limited, East Cowes, Isle-of-Wight, England Application November 29, 1947, Serial No. 788,868
In Great Britain October 16, 1946

Section 1, Public Law 690, August 8, 1946
Patent expires October 16, 1966

9 Claims. (Cl. 244—83)

In an aircraft fitted with fully power-operated flying controls, there would normally be no resistance to movement of the pilot's control member. This is undesirable, and the object of this invention is to provide a feel generator whereby "feel" may be artificially applied to the control member. The feel generator is arranged, according to the invention, to apply to the control member, a resistance to movement which:

(a) increases, preferably linearly, or approximately so, with displacement of the control member from its neutral position, and (b) increases with the airspeed and preferably varies approximately as the square of the airspeed.

The invention provides in or for an aircraft, a hydraulic feel generator, comprising a housing having an outlet at each end, a pump for feeding liquid under pressure to the two ends of the housing, a piston shaped to fit the housing and movable therein by the pilot's control member, in a direction and to an extent determined by the direction and extent of movement of the pilot's control member from a neutral position, to expel liquid through one of the outlets, valve mechanism for controlling the effective areas of the outlets and operable by the pilot's control member to cause, as the piston moves in the housing from neutral position, a progressively increasing opposing hydraulic pressure at the end of the housing towards which the piston is moving, and a device responsive to changes in airspeed for exerting additional control over the valve mechanism so as to cause the hydraulic resistance to movement of the piston in its housing to increase as the airspeed increases.

Three forms of hydraulic feel generator according to the invention will now be described in detail, by way of example, with reference to the accompanying drawings, in which:

Fig. 1 is a diagram showing the first form,

Fig. 2 is a vertical section through the second form,

Fig. 3 is a section on the line III—III in Fig. 2,

Fig. 4 is a section on the line IV—IV in Fig. 2,

Like reference numerals designate like parts throughout the figures.

Figure 5:
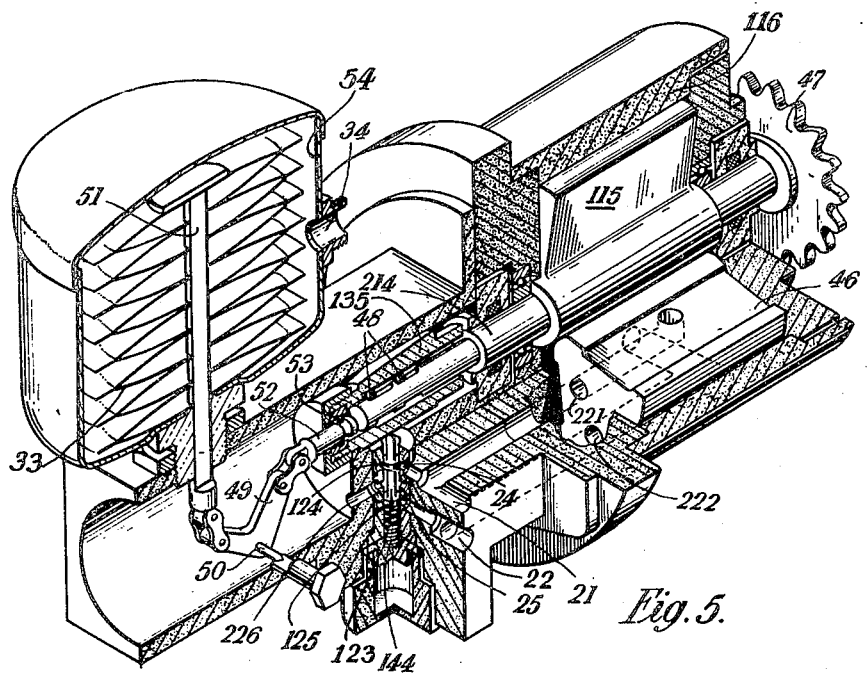
Fig. 5 is a perspective view, partly in section, of the third form.

Considering first of all the arrangement shown in Fig. 1, the pilot's control member 10, which is rotatable about a pivot 11 from the neutral position shown, carries a toothed quadrant 12 meshing with rack teeth 13 on a rod 14 fixed to a piston 15 movable in a cylinder 16. The piston rod 14 is connected to a link 17 for imparting movement to a power unit for operating a control surface to be moved in sympathy with movement of the member 10. This link 17 may be arranged to actuate the electric sender unit of the remotely controlled power operated flying control system described in U. S. Application Serial No. 788,869, now U. S. Patent No. 2,517,680, issued on August 8, 1950.

A gear pump 18, operated by an electric motor (not shown), serves to feed oil, supplied to the pump from a sump 19 through pipe 20, under pressure through pipes 21, 22 leading to opposite ends of the cylinder 16. A twin relief valve 23 serves to control exhaust outlets 24, 25 from the ends of the cylinder, whence the oil is returned to the sump through pipe 26. In the neutral position of member 10 shown in Fig. 1, piston 15 is in the mid position in cylinder 16, and the relief valve 23 occupies a central position in which the effective areas of outlets 24, 25 are equal and equal hydraulic pressure is applied to the two sides of piston 15.

A lever 27, pivoted on a pin 28, engages a slot in the relief valve 23, and at its lower end, engages a rod 29 having rack teeth 30 meshing with a pinion 31 fixed to the pilot's control member 10.

On movement of member 10 in either direction from its neutral position, rod 29 will be moved in the opposite direction to the piston 15, causing, through the agency of lever 27, the relief valve 23 to move axially in the same direction as the piston 15, thereby reducing the area of the outlet through which the piston is expelling oil from the cylinder and increasing the area of the other outlet. A differential hydraulic pressure, opposing movement of the piston 15 in its cylinder, is thus built up progressively as the movement of piston 15 from its neutral position increases. The resistance to movement of the control member 10 thus increases with the displacement of the control member from its neutral position. The pin 28 is carried by a strap 32 attached to the lower end of a stack of capsules 33. The capsule stack is fixed at its upper end and is exposed internally to dynamic air pressure, introduced through an inlet 34 connected to a Pitot head (not shown). As the airspeed increases, the capsule stack 33 will expand, moving the pin 28 downwardly and so increasing the movement imparted to the relief valve 23 per unit movement of the rod 29. The rate of build up of differential hydraulic pressure opposing movement of the piston 15, and therefore of the control member 10, is thus a function of airspeed, increasing as the airspeed increases.

In the arrangement shown in Figs. 2–4, the piston rod 14 is intended to be connected at its left-hand end to the pilot's control member, and at its right-hand end to the power unit for moving the control surface. The right-hand end 114 of the piston rod is of reduced diameter, and rotatably mounted on this reduced portion is a cam 35 integral with a pinion 36 meshing with a rack 37 attached to the capsule stack 33. As the airspeed changes therefore, the cam 35 will be rotated in relation to the piston rod. A spring 45 opposes expansion of the capsule stack 33.

Referring particularly to Fig. 3, it will be seen that liquid under pressure is fed from the pump into inlets 21, 22 in a housing 38, adjoining the cylinder 16, and thence through passages 121, 122 leading to the two ends of the cylinder 16. The exhaust outlets 24, 25 controlled by the relief valve 23 lead to the hollow interior 39 of housing 38 whence the oil can flow to the sump through an outlet 126 (Fig. 2).

The position of the valve 23 is controlled by an arm 40 (Fig. 2) rigid with and to the rear of an arm 41 pivoted on a stud 42. The arm 41 carries a follower 43 pressed by a spring 44 into engagement with the cam 35.

If the piston 15 is moved to the right, arm 41 will be caused by the cam 35 to move clockwise, thereby moving the valve 23 downwards, as seen in Fig. 2, to reduce the area of outlet 25 and increase the area of the outlet 24, thereby building up a hydraulic pressure difference which opposes movement of the piston 25.

The position of the valve 23, and therefore the resistance imposed to movement of the pilot's control member, is thus a joint function of the displacement of the pilot's control member from neutral position and of the airspeed.

It will be noted from Fig. 4, that the cam 35 is of circular section throughout, the centre of each circular section being offset from the centre of the rod 114. As the cam 35 is rotated by the capsule stack 33 in response to changes in airspeed, a portion of different shape will be brought into cooperation with the follower 43, with the result that the movement imparted to valve 23, per unit movement of the pilot's control member will be altered, thus giving a change in the resistance to movement of the pilot's control member appropriate to the change in airspeed.

Figure 6:
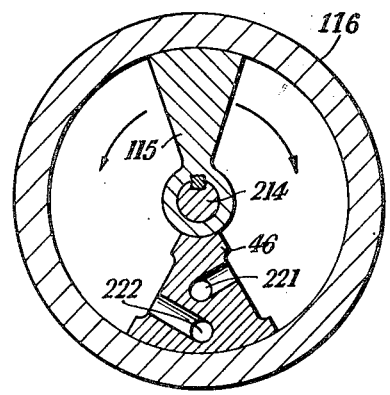
Fig. 6 is a section through the housing of the piston shown in Fig. 5.

The arrangement shown in Figs. 5 and 6 employs, in place of a piston which reciprocates in a cylinder in response to movement of the pilot's control member, a rotary piston 115, which is arranged to rotate in an appropriately shaped housing 116, as the pilot's control member is moved. Rotary movement is imparted to the piston 115 by a sprocket 47, coupled to the pilot's control member by a chain drive, not shown. In this case the movement is imparted from the piston 115 to the relief valve 123 through a cam 135, arranged to move axially in response to changes in airspeed, on a rod 214 fixed to the piston 115 and projecting from the housing 116.

The housing 116 contains a dividing block 46, and the pressure inlets 21, 22 communicate with opposite ends of the housing by means of passages 221, 222. The exhaust outlets 24, 25 to a common exhaust port 226 are respectively controlled by lands 124, 125 on the valve 123, which is held in contact with the cam 135 by a spring 144. The cam 135 is shaped so that if the piston 115 is rotated clockwise as seen in Fig. 5, i. e. in the direction to expel oil from the housing through the passage 221, the valve 123 will move down to cause its upper land 124 to reduce the area of outlet 24 and its lower land 125 to increase the area of outlet 25. If the piston 115 rotates in the other direction, the valve 123 moves up to achieve the reverse effect. In both cases the resistance imparted to movement of the piston increases with its displacement from neutral position in its housing.

Balls 48, engaging cooperating grooves in the rod 214 and cam 135, serve to impart rotary movement to the cam as the piston 115 rotates in its housing, while nevertheless permitting of axial adjustment of the cam 135 in relation to the rod by the capsule stack 33 as the airspeed changes. This axial adjustment is imparted to the cam through the agency of a rod 51 fixed to the upper end of the capsule stack, a bell crank lever 49 pivoted on a stud 50, a spindle 52 and balls 53. It will be noted that, in this case, the capsule stack is evacuated and exposed externally to dynamic air pressure applied, through inlet 34, to the interior of a casing 54 to which the capsule stack is fixed at its lower end. As the airspeed increases, the capsule stack collapses, moving the cam 135 axially to the left, as seen in Fig. 5, thereby bringing into cooperation with the valve 123 a cam portion of greater radius, with the result that the movement imparted to the valve per unit movement of the pilot's control member is increased.

In all of the arrangements described the hydraulic circuit is self-contained and the resistance to movement is maintained by unbalanced pressures across the piston, which vary in desired relationship with displacement of the pilot's control member and changes in airspeed. The pump may conveniently be a gear pump, as shown, driven by a small electric motor, and the device has the advantage of damping the movement of the control member.

The feel generator according to the invention is applicable to control of the elevator, ailerons or rudder, and a separate unit will be used for each flying control, being linked to the control column in the first two cases and to the rudder bar in the last case.

What we claim as our invention and desire to secure by Letters Patent is:

1. In an aircraft, the combination with a control member, movable in opposite directions from a neutral position for the purpose of imparting movement to a control surface, of a hydraulic feel generator, said feel generator comprising a piston, a housing containing and shaped to fit said piston, outlets in said housing at opposite sides of said piston, a connection between said control member and said piston for moving said piston in said housing in a direction determined by the direction of movement of said control member to expel liquid through one of said outlets, valve mechanism for controlling the effective areas of said outlets, an operative connection between said control member and said valve mechanism for imparting movement to said valve mechanism to reduce, progressively with movement of said control member from neutral position, the effective area of that outlet through which said piston is expelling liquid, a device responsive to changes in airspeed of the aircraft, and a member operated by movement of said responsive device for modifying said operative connection in accordance with changes in airspeed, so as to increase, progressively with increase in airspeed, the movement imparted to said valve mechanism by said control member.

2. In an aircraft, the combination with a control member, movable in opposite directions from a neutral position for the purpose of imparting movement to a control surface, of a hydraulic feel generator, said feel generator comprising a piston, a housing containing and shaped to fit said piston, outlets in said housing at opposite sides of said piston, a connection between said control member and said piston for moving said piston in said housing in a direction determined by the direction of movement of said control member to expel liquid through one of said outlets, a twin relief valve controlling the effective areas of both of said outlets, an operative connection between said control member and said relief valve for moving said relief valve, in a direction determined by the direction of movement of said control member, so as to effect progressively, with movement of said control member from neutral position, reduction in effective area of that outlet through which said piston is expelling liquid and increase in effective area of the other outlet, a device responsive to changes in airspeed of the aircraft, and a member operated by movement of said responsive device for modifying said operative connection in accordance with changes in airspeed so as to increase, progressively with increase in airspeed, the movement imparted to said relief valve by said control member.

3. In an aircraft, the combination with a control member movable in opposite directions from a neutral position for the purpose of imparting movement to a control surface, of a hydraulic feel generator, said feel generator comprising a piston, a housing containing and shaped to fit said piston, means for supplying to the portions of the housing on opposite sides of said piston hydraulic pressure opposing movement of the piston in said housing, a connection between said control member and said piston for moving said piston in said housing in a direction determined by the direction of movement of said control member, valve mechanism for controlling the hydraulic pressure opposing movement of the piston in its housing, a connection between said control member and said valve mechanism for operating the valve mechanism to increase, progressively with movement of the control member from neutral position, the opposing hydraulic pressure, a device responsive to changes in airspeed of the aircraft, and a member operated by movement of said responsive device for modifying said operative connection in accordance with changes in airspeed so as to increase, progressively with increase in airspeed, the opposing hydraulic pressure established by said valve mechanism.

4. In an aircraft, the combination with a control member, movable in opposite directions from a neutral position for the purpose of imparting movement to a control surface, of a hydraulic feel generator, said feel generator comprising a piston, a housing containing and shaped to fit said piston, outlets in said housing at opposite sides of said piston, a connection between said control member and said piston for moving said piston in said housing in a direction determined by the direction of movement of said control member to expel liquid through one of said outlets, a twin relief valve controlling the effective areas of both of said outlets, a supporting member a lever pivoted on said supporting member and coupled to said relief valve, a connection between said control member and said lever which is effective, on movement of said control member, to rock said lever about its pivot and thereby to move said relief valve in a direction determined by the direction of movement of said control member, so as to effect, progressively with movement of said control member from neutral position, reduction in effective area of that outlet through which said piston is expelling liquid and increase in effective area of the other outlet, a device responsive to changes in the airspeed of the aircraft for moving said supporting member to displace the pivot of said lever relatively to said relief valve in the direction to cause increase, progressively with increase in the airspeed, of the movement imparted to said relief valve by the control member.

5. In an aircraft, the combination with a control member, movable in opposite directions from a neutral position for the purpose of imparting movement to a control surface, of a hydraulic feel generator, said feel generator comprising a piston, a housing containing and shaped to fit said piston, outlets in said housing at opposite sides of said piston, a connection between said control member and said piston for moving said piston in said housing in a direction determined by the direction of movement of said control member to expel liquid through one of said outlets, a twin relief valve controlling the effective areas of both of said outlets, a piston rod attached to the piston and projecting from the housing, a cam carried by the piston rod, a follower operated by the cam for moving, on movement of said control member, said relief valve, in a direction determined by the direction of movement of said control member, so as to effect, progressively with movement of said control member from neutral position, reduction in effective area of that outlet through which said piston is expelling liquid and increase in effective area of the other outlet, a device responsive to changes in the airspeed of the aircraft, and means operable by said responsive device for moving said cam in relation to said piston rod to adjust said relief valve in the direction to cause increase, progressively with increase in the airspeed, of the movement imparted to said relief valve by the control member.

6. In an aircraft, the combination claimed in claim 5, in which the connection between the control member and the piston imparts reciprocating movement to the piston on movement of the control member, and in which the responsive device is operative to rotate the cam in relation to the piston rod.

7. In an aircraft, the combination claimed in claim 5, in which the connection between the control member and the piston imparts rotary movement to the piston on movement of the control member, and in which the responsive device is operative to effect axial movement of the cam in relation to the piston rod.

8. In an aircraft, the combination with a control member movable in opposite directions from a neutral position for the purpose of imparting movement to a control surface, of a hydraulic feel generator, said feel generator comprising a piston, a housing containing and shaped to fit said piston, outlets from said housing at opposite sides of said piston, a connection between said control member and said piston for moving said piston in said housing, in a direction determined by the direction of movement of said control member, to expel liquid from the housing through one of said outlets, valve mechanism for controlling the flow of liquid through said outlets, an operative connection between said control member and said valve mechanism for operating said valve mechanism to decrease, progressively with increase in displacement of said control member from its neutral position, the effective area of that outlet through which said piston is expelling liquid, and a device responsive to changes in airspeed, means operable by said responsive device for exerting additional control over said valve mechanism to cause the hydraulic resistance to movement of said piston to increase with increase in airspeed.

9. In an aircraft, the combination with a control member movable in opposite directions from a neutral position for the purpose of imparting movement to a control surface, of a hydraulic feel generator, said feel generator comprising a piston, a housing containing and shaped to fit said piston, outlets from said housing at opposite sides of said piston, a connection between said control member and said piston for moving said piston in said housing, in a direction determined by the direction of movement of said control member, to expel liquid from the housing through one of said outlets, valve mechanism for controlling the flow of liquid through said outlets, an operative connection between said control member and said valve mechanism for operating said valve mechanism to decrease, progressively with increase in displacement of said control member from its neutral position, the effective area of that outlet through which said piston is expelling liquid, and means for modifying said operative connection so as to vary the movement imparted to said valve mechanism by said control member.

HENRY KNOWLER.
ARTHUR EDWARD SWAIN.

REFERENCES CITED

The following references are of record in the file of this patent:

UNITED STATES PATENTS

| Number | Name | Date |
|---|---|---|
| 2,140,037 | Swisher | Dec. 13, 1938 |
| 2,432,502 | Bentley et al. | Dec. 16, 1947 |
| 2,445,343 | Tyra | July 20, 1948 |

FOREIGN PATENTS

| Number | Country | Date |
|---|---|---|
| 321,851 | Great Britain | Dec. 3, 1928 |
| 569,290 | Great Britain | May 16, 1945 |
| 570,030 | Great Britain | June 19, 1945 |